(No Model.)

W. H. CRAIG.
PLATE LIFTER.

No. 561,969. Patented June 16, 1896.

Witnesses
Jas. J. Maloney.
J. P. Livermore

Inventor.
Warren H. Craig,
by Jos. P. Livermore
Atty.

UNITED STATES PATENT OFFICE.

WARREN H. CRAIG, OF LAWRENCE, MASSACHUSETTS.

PLATE-LIFTER.

SPECIFICATION forming part of Letters Patent No. 561,969, dated June 16, 1896.

Application filed March 18, 1895. Serial No. 542,120. (No model.)

*To all whom it may concern:*

Be it known that I, WARREN H. CRAIG, of Lawrence, county of Essex, State of Massachusetts, have invented an Improvement in Plate-Lifters, of which the following description, in connection with the accompanying drawings, is a specification, like letters on the drawings representing like parts.

The present invention relates to a plate-lifter or lifting device for cooking utensils of various kinds which are not provided with handles and are therefore difficult of manipulation when hot.

The device embodying the present invention consists of two members movable with relation to each other, the said members each comprising a longitudinal portion terminating in a hook or bend and being so arranged with relation to each other that the longitudinal extensions together form a handle for the device, while the hook portions are adapted to engage the sides or lower edges of a bowl or plate to be lifted, as from a stove or an oven. The said longitudinal or handle portions are furthermore so arranged with relation to each other that when they are gripped together they cause the lower extremities of the hook portions to approach each other, thus firmly gripping the object engaged between them. Each of the said members consists, preferably, of a single piece of ordinary wire bent into such shape as to properly engage with the other and to form the longitudinal and hook portions, as desired, thus rendering the device extremely simple and inexpensive.

Figure 1:
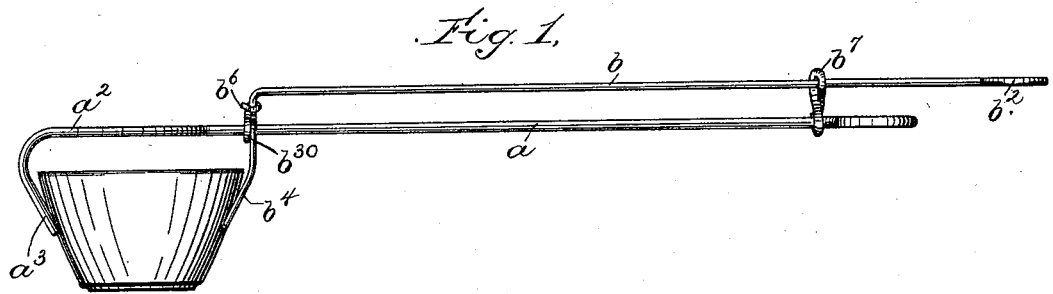
Figure 2:
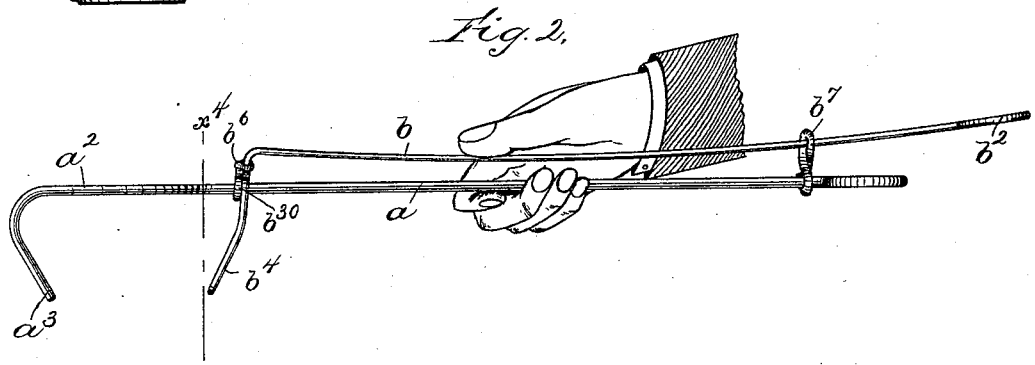
Figure 3:
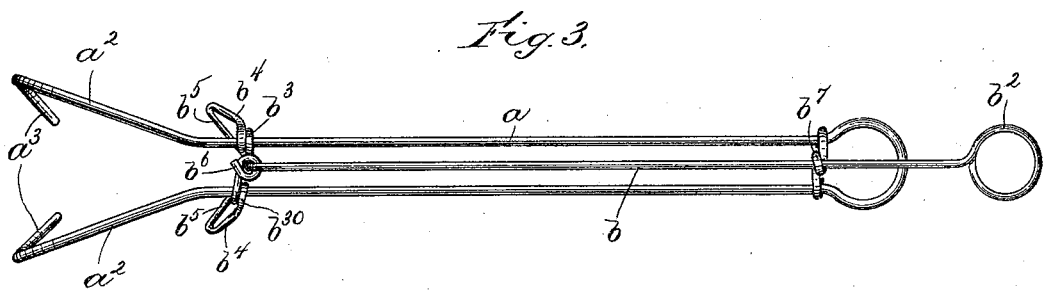

Figure 1 is a side elevation of the device, showing a receptacle, such as a bowl, engaged thereby; Fig. 2, a similar view showing the relation of the two members to each other when gripped by the operator; Fig. 3, a top plan view of the device; and Fig. 4, a sectional view on line $x^4$, Fig. 2, showing in front elevation the hooked extremity of the upper member.

While the two members are relatively movable, the member $a$, which preferably consists of a single piece of heavy wire or a rod made in the form of a loop with two longitudinal parallel portions constituting a handle and having their extremities $a^2$ somewhat spread apart and bent downward to form two hooks $a^3$ at some distance from each other, may for convenience be called the "fixed" member, while the member $b$ may be called the "movable" member. The said movable member $b$ consists, preferably, of a single rod or piece of wire, which may, if desired, be somewhat lighter than that which forms the fixed member $a$, and has a straight handle portion substantially parallel with that of the member $a$, said straight portion being provided at one end with a loop $b^2$, by which it may be conveniently moved longitudinally with relation to the member $a$. The said members are connected together so as to be longitudinally and pivotally movable with relation to each other by forming in the hook portion of the member $b$ loops which encircle the member $a$ and constitute a sliding fulcrum for the member $b$ with relation to the member $a$. The member $b$ is provided at its end with a hooked portion to engage the other side of the article to be lifted from that engaged by the portions $a^3$ of the member $a$, the said hooked portion of the member $b$ extending below the member $a$, while the handle portion thereof is supported somewhat above said member $a$, the opposite or handle end of said member $b$ being also supported above the member $a$ by a supplemental-guide support, as will be described.

Figure 4:
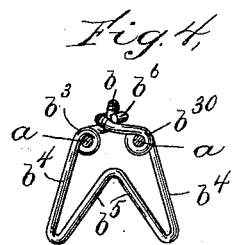

Referring to Figs. 3 and 4, the end of the member $b$ is bent downward and then laterally toward one side of the member $a$, after which it is bent into a loop encircling one side of the member $a$, and thus forming a sliding-fulcrum loop $b^3$. The said rod or wire is then bent downward and forward into a hook or loop $b^4$, which may be of any desired shape, but which is preferably formed with an upwardly-extending tongue $b^5$, in order to make a stronger engaging-hook for the side of the article which is to be lifted. The downwardly-extending portion $b^4$ of the upward tongue or fold $b^5$ constitutes, practically, a double hook or a broad hook capable of engaging the periphery of the article to be lifted at two points. The opposite side of the said loop then extends upward and is bent around the opposite side of the member $a$, forming a sliding-fulcrum loop $b^{30}$, which corresponds to the loop $b^3$, and said wire terminates after encircling the other side of the member $a$ at $b^6$.

The point where the extremity $b^6$ of the wire encircles and fastens to the handle portion $b$ is above the level of the handle portion $a$ of the other member, and the guide and hook portion of the member $b$ is thus offset and substantially at right angles to the handle portion thereof, which is substantially parallel with, but a short distance laterally from, the handle portion of the member $a$. The said member $b$ is thus supported and guided by means of the guides or connecting portions $b^3$ and $b^{30}$, surrounding the opposite sides of the member $a$, although it is capable of longitudinal movement with relation to said member $a$. In order to support the opposite end of the said member $b$ and maintain it in approximately parallel position with relation to the member $a$, a supplemental guide $b^7$ at or near the outer end of said member $a$ is provided, consisting, preferably, of a wire loop extending from one side of the member $a$ around the said member $b$ to the other side of said member $a$, as shown herein. Thus when an article, such as a bowl or plate, is to be lifted the member $a$ is extended across the top thereof and drawn back until the hooked extremities $a^3$ engage the sides of the said article, and the member $b$ is then pushed forward until it engages the opposite side of the said article, after which the two members together are gripped by the operator at a point between the supplemental guide $b^7$ and the main guides $b^3$ and $b^{30}$, and the article is lifted, the said members being held in proper relation to each other by the grip of the operator. It will be seen, moreover, that the two portions $b^3$ and $b^{30}$ of the member $b$ thus form a fulcrum or pivotal joint for the said members between the main and hooked portions thereof, so that as the longitudinal portions thereof are pressed toward each other the tendency will be to move the hooked extremities of the said members toward each other and the article engaged between them, thus causing the engagement to be more effectual and rendering it practical to lift an article having substantially vertical sides. This feature is clearly shown in Fig. 2, which indicates the effect upon the extremities $b^5$ of the downward pressure upon the longitudinal portion $b$ caused by the two members $a$ and $b$ being firmly gripped together by the operator. In this figure the member $a$ is represented as substantially straight, while the member $b$ alone is bent in response to the grip of the operator. It should be understood, however, that either or both members may yield to the grip, it being found better in practice, however, to make the member $a$ of heavier wire and practically rigid.

While the construction herein shown is believed to be simple and practical, it is not intended to limit the invention specifically thereto, since the said construction might obviously be modified without making any essential changes therein.

I claim—

1. A lifting device consisting of a member $a$ having parallel rods constituting a handle portion and downwardly-extending hooked extremities therefrom adapted to engage one side of an article to be lifted; combined with the member $b$ comprising a handle portion substantially parallel with that of the other member, and guide-loops encircling the handle portion of the other member and constituting a sliding fulcrum thereon, and a downwardly-extending hook to engage with the other side of the article to be lifted; and a guide $b^7$ engaging the handle portion of the member $b$ and supported on the member $a$ near the end thereof remote from the hooked extremities, said member $b$ having a sliding movement with relation to the member $a$ and a pivotal movement on its fulcrum-guide, whereby its hooked extremities are caused to approach those of the member $a$, when the handle portion of the member $b$ is pressed toward the handle portion of the member $a$, substantially as and for the purpose described.

2. A lifting device consisting of a member $a$ having parallel rods constituting a handle portion and provided with hooked extremities to engage one side of the article to be lifted; combined with the member $b$ composed of a single integral piece of wire having a straight handle portion substantially parallel with that of the member $a$ and at the end of said handle portion being bent or offset and provided with a loop $b^3$ encircling one rod of the handle portion $a$ and below said loop being formed with a double downwardly-projecting hook, and a guide-loop $b^{30}$ encircling the other rod of the handle $a$ and being finally looped around the offset portion at the end of the handle portion, substantially as described.

In testimony whereof I have signed my name to this specification in the presence of two subscribing witnesses.

WARREN H. CRAIG.

Witnesses:
H. J. LIVERMORE,
JAS. J. MALONEY.